United States Patent [19]

Staehlin

[11] Patent Number: 4,484,486
[45] Date of Patent: Nov. 27, 1984

[54] CONCENTRIC PULLEY DRIVE ASSEMBLY

[75] Inventor: John H. Staehlin, Lutherville, Md.

[73] Assignee: Westinghouse Electric Corp., Pittsburgh, Pa.

[21] Appl. No.: 327,156

[22] Filed: Dec. 3, 1981

[51] Int. Cl.³ .............................................. F16H 21/12
[52] U.S. Cl. ......................................... 74/96; 74/89.2; 74/798; 74/501 M
[58] Field of Search .......... 74/96, 89.2, 89.21, 74/89.22, 798, 501 R, 501 M; 343/766, 763

[56] References Cited

U.S. PATENT DOCUMENTS

| 1,921,402 | 8/1933 | Wlley | 74/89.2 X |
| 2,225,845 | 12/1940 | Richolt | 74/89.21 X |
| 2,749,759 | 6/1956 | Kienhöfer | 74/89.22 |
| 2,786,361 | 3/1957 | Russell | 74/96 X |
| 3,403,474 | 10/1968 | Spasoff | 74/89.22 X |
| 3,509,782 | 5/1970 | Molnar | 74/501 R |
| 3,691,821 | 9/1972 | Gladow et al. | 74/798 |
| 3,710,631 | 1/1973 | Gladow | 74/89.2 |
| 3,743,381 | 2/1973 | Moodie | 74/89.22 X |
| 3,810,689 | 5/1974 | Moodie | 74/89.22 X |
| 3,850,043 | 11/1974 | Tarbox | 74/89.2 |
| 3,859,862 | 1/1975 | Brems | 74/89.21 X |
| 3,896,447 | 7/1975 | Majkrzak | 74/89.21 X |
| 3,961,543 | 6/1976 | Morgenstern et al. | 74/501 M |
| 4,170,147 | 10/1979 | Durno et al. | 74/501 R |
| 4,392,140 | 7/1983 | Bastian et al. | 74/89.22 X |

FOREIGN PATENT DOCUMENTS 1210402 9/1958 France .................................. 74/96

Primary Examiner—Kenneth Dorner
Assistant Examiner—Anthony W. Raskob, Jr.
Attorney, Agent, or Firm—W. E. Zitelli

[57] ABSTRACT

A concentric pulley drive assembly is disclosed as having a central pulley mounted to a motor axle and rotatably driven therewith by a drive motor. A partial pulley in the form of a partial annulus is positioned about a portion of the periphery of the central pulley concentrically with respect to the motor axle. A tape strip coupling the two pulleys transmits torque from the central pulley to the partial pulley to induce annular rotations of the partial pulley about the motor axle commensurate with the annular rotation of the central pulley. An antenna or sensor support platform is coupled to the extremities of the partial pulley for pivotal positioning about the motor axle in conjunction with the annular rotation of the motor axle.

9 Claims, 3 Drawing Figures

CONCENTRIC PULLEY DRIVE ASSEMBLY

BACKGROUND OF THE INVENTION

The present invention relates to torque transfer drive assemblies, in general, and more particularly to a concentric pulley drive assembly having first and second pulleys concentrically mounted about a drive motor axle for transmitting torque from the first pulley to the second pulley utilizing a torque transfer medium to induce annular rotation of the second pulley about the motor axle commensurate with the annular rotation of the first pulley and to pivotally position a support structure coupled to the second pulley about the motor axle in conjunction with the annular rotation of the second pulley.

In general, airborne antenna and sensor gimbal systems utilize pulley drive mechanisms with medium to light torque requirements. These systems generally contain two or more pulleys whose axles are separated one from the other with the span therebetween bridged by a torque transmitting tape or belt. Generally, a platform structure for supporting a radar antenna or sensor is coupled to one of the pulleys for pivotal positioning about the axle thereof. In these systems, the structural envelope occupied by the pulley drive assembly as the platform moves between its limit positions is almost always larger than the envelope occupied by a comparably performing concentric pulley drive system. As a result, the physical space swept in the motion of the structural envelope of the multiple axle assembly becomes a limitation to the gimbal travel.

The present invention as described in connection with a preferred embodiment herebelow offers a more compact pulley drive mechanism. The preferred embodiment utilizes a set of pulleys interconnected concentrically one to the other with a zero backlash torque transfer tape medium. As a result of this unique concentric pulley assembly, the structural envelope occupied by the drive assembly as the platform moves between its limit positions is reduced substantially allowing greater angular travel without mechanical interference.

SUMMARY OF THE INVENTION

In accordance with the present invention, a concentric pulley drive assembly comprises a frame fixedly mounted to a base for supporting a motor and its axle away from the base. A first pulley is disposed on the motor axle and is rotatably driven together with the axle by the motor. At least one second pulley is contoured for positioning about a portion of the periphery of the first pulley concentrically with respect to the motor axle. Torque is transmitted from the first pulley to the second pulley by a torque transmitting medium to induce annular rotation of the second pulley about the motor axle commensurate with the annular rotation of the first pulley. In addition, a support structure is coupled to the second pulley and is pivotally positionable about the motor axle in conjunction with the annular rotation of the second pulley.

Preferably, the torque transmitting medium includes at least one strip of tape which couples the first and second pulleys and is fixed at one point to a position on the periphery of the first pulley and at another point to a position on the frame. Also preferable is that the second pulley be in the form of a partial annulus pivotally mounted in juxtaposition with a portion of the periphery of the first pulley for annular rotation about the motor axle.

In one embodiment, the concentric pulley drive assembly includes a pair of brackets attached to each extremity of the second pulley to couple the support structure thereto, each pair of brackets being spaced sufficiently to support therebetween a roller pulley which is located at each extremity. Accordingly, the torque transmitting tape is disposed about the portion of the first pulley in juxtaposition with the second pulley, extended around at least one of the two roller pulleys, and disposed along the periphery of the second pulley opposite that in juxtaposition with the first pulley. In this assembly, the tape is fixedly attached to a point on the periphery of the first pulley and to at least one point on the frame.

DESCRIPTION OF THE PREFERRED EMBODIMENT

Figure 2:
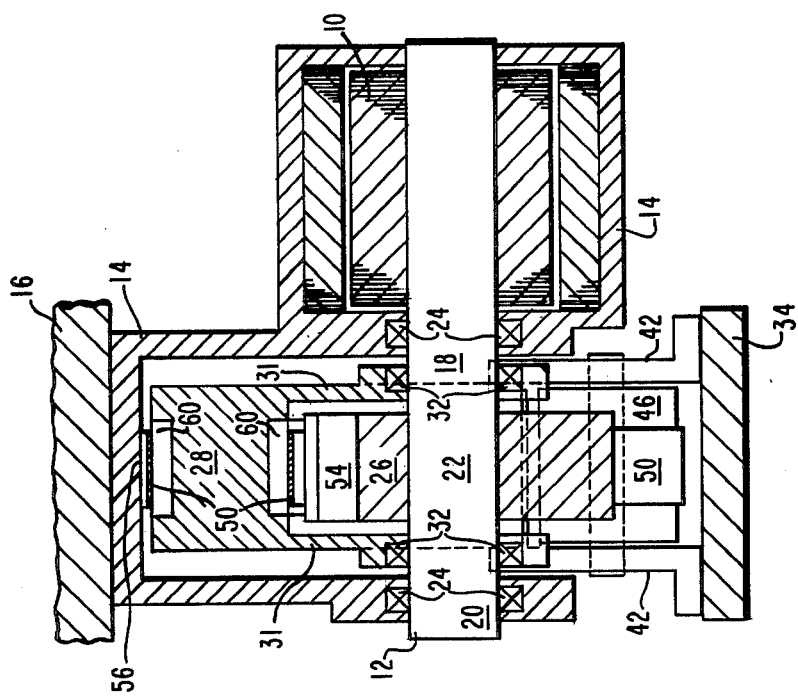
FIG. 2 is a cross-sectional view of the concentric pulley drive assembly depicted in FIG. 1.
Figure 1:
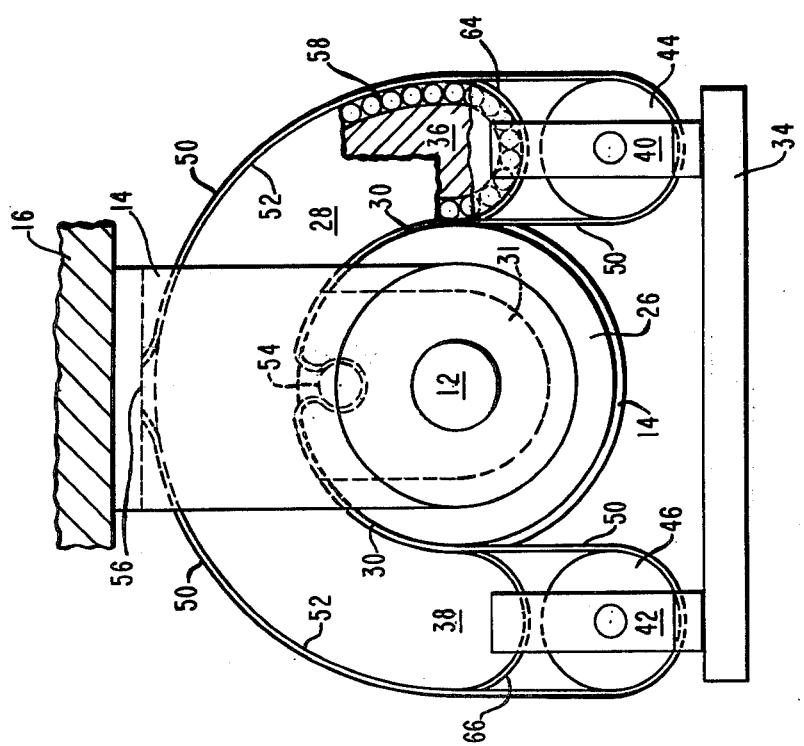
FIG. 1 depicts a simplified structural front view of a concentric pulley drive assembly suitable for embodying the principles of the present invention.

Both FIGS. 1 and 2 will be referred to together as structural illustrations in connection with the following description of the preferred embodiment of the invention. Referring to FIGS. 1 and 2, a drive motor 10, which may be an electric motor or some other source of drive torque, for example, has an axle 12 protruding therefrom which is rotatably driven by the motor 10. A frame 14 which is fixedly mounted to a base 16 supports the motor 10 and axle 12 away from the base 16. In the present embodiment as shown by the view of FIG. 2, the axle 12 is supported by the frame 14 at a position 18 nearest the motor 10 and at a position 20 further away from the motor 10 with the portion 22 of the axle 12 bridged therebetween. Bushings 24 may be disposed at the supporting frame positions 18 and 20 to facilitate rotation of the axle 12.

A first pulley or central pulley 26 may be disposed on the bridge portion 22 of the motor axle 12 and be rotatably driven therewith by the drive motor 10. At least one second pulley 28 may be contoured for positioning about a portion 30 of the periphery of the central pulley 26 concentrically with respect to the motor axle 12. In the preferred embodiment, the second pulley 28 is a partial pulley in the form of a partial annulus and is pivotally mounted on the bridged portion 22 of the motor axle 12 in juxtaposition with the portion 30 of the periphery of the central pulley 26 for annular rotation about the motor axle 12. As shown by the FIGS. 1 and 2, the central pulley 26 and partial pulley 28 may be housed partially within the frame 14. More specifically, the partial annulus 28 may have sidewalls 31 for pivotal mounting on the bridge portion 22 of the motor axle 12 on both sides of the central pulley 26. Accordingly, the sidewalls 31 include bushings 32 to facilitate rotation of the motor axle 12.

The preferred embodiment as depicted in the views of FIGS. 1 and 2 includes a support structure 34, which may be a platform for supporting a radar antenna or sensor or the like, for example. The support structure 34 may be coupled to the partial pulley 28 and pivotally positionable about the motor axle 12 in conjunction with the annular rotation of the partial pulley 28. More particularly, the support structure 34 may be coupled to the extremities 36 and 38 of the partial pulley 28 with corresponding pairs of brackets 40 and 42, respectively. In the present embodiment, the pairs of brackets may be spaced apart to additionally support therebetween a roller pulley 44 and 46 which may be located at each extremity 36 and 38, respectively.

A torque transmitting medium is included to transmit torque from the first or central pulley 26 to the partial pulley 28 to induce annular rotation of the partial pulley 28 about the motor axle 12 commensurate with the annular rotation of the central pulley 26. The torque transmitting medium may include at least one strip of tape or belt 50, which may be made of steel, for example. In the preferred embodiment, the tape 50 is disposed about the portion 30 of the periphery of the central pulley 26, extended around the two roller pulleys 44 and 46 in a reversed wrap fashion, and disposed along the outer periphery 52 of the partial pulley 28 which is opposite that in juxtaposition with the central pulley 26. The tape 50 may be fixedly attached to a point 54 on the periphery 30 of the central pulley 26 and in addition, to at least one point 56 of the frame 14 or possibly the base 16.

It is preferred that the coefficient of friction between the peripheral surfaces of the pulleys 26 and 28 with the tape strip 50 be minimized in order to optimize operational performance of the concentric pulley drive assembly. To accomplish this in the preferred embodiment, at least one set of recirculating roller bearings 58 is disposed along a peripheral race 60 of the partial pulley 28. In order to maintain the roller bearings 58 in the peripheral raceway 60 at the extremities 36 and 38 of the partial pulley 28, sheet metal guides 64 and 68 may be provided thereat and supported by the bracket pairs 40 and 42, respectively. Accordingly, the sheet metal guides 64 and 66 prevent the roller bearings 58 from falling out at the extremities 36 and 38, respectively and cause them to recirculate. Alternatively, the aforementioned peripheral surfaces in contact with the tape strip 50 may be comprised of a material to minimize the coefficient of friction with the tape strip 50.

In operation, torque is transmitted from the central pulley 26 to the partial pulley 28 through the zero backlash tape 50 which is fixed at points 54 and 56 and wrapped about the pulleys 26, 44, 46 and 58 as described hereabove. More specifically, as the central pulley 26 is driven by the drive motor 10 via axle 12 annularly about an angle $\theta_1$, an annular rotation is induced in the partial pulley 28 to an angle $\theta_2$ as a result of the unwrapping of the tape 50 from the central pulley 26 and the wrapping of the arc length of unwrapped tape 50 onto the partial pulley 28. The frictional torque created due to the relative motion between the tape 50 which passes along the peripheries of the partial and central pulleys 26 and 28, respectively, is minimized with the inclusion of the set of recirculating roller bearings 58 about the periphery of the partial pulley 28.

If it is assumed that the central pulley 26 has a radius denoted as R1 and the partial pulley 28 has an outside radius denoted as R2, both measured with respect to the axis of the motor axle 12, then the arc length of the unwrapped tape from the central pulley 26 may be denoted as $R1\,\theta_1$ and the tape 50 wrapped onto the partial pulley 28 may be denoted as $R2\,\theta_2$. Because the tape drive assembly has essentially zero tape backlash, the arc length of the tape 50 which is unwrapped from the central pulley 26 is equal to the arc length of the tape 50 which is wrapped onto the partial pulley 28. Therefore, $$R1\theta_1 = R2\theta_2. \qquad (1)$$

Figure 3:
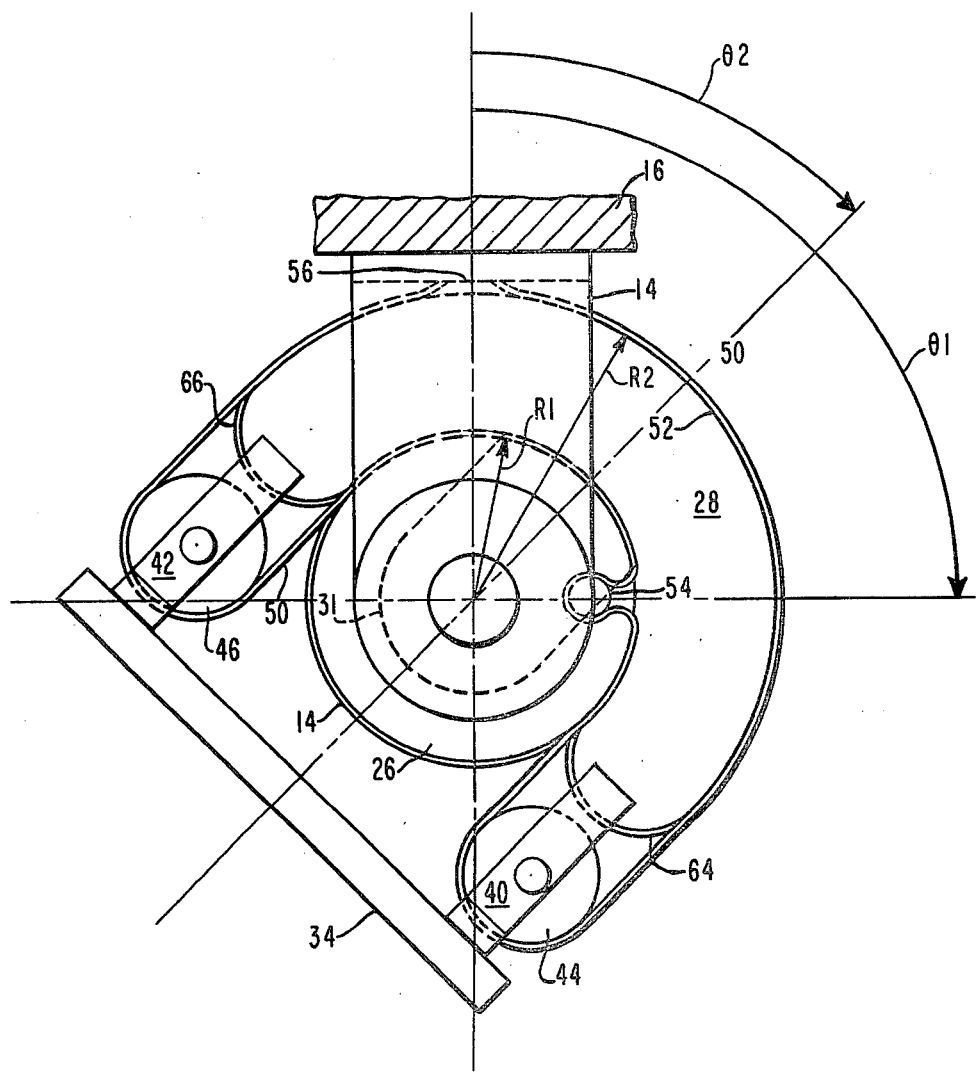
FIG. 3 is another structural front view of the concentric pulley drive assembly embodiment of FIG. 1 illustrating the annular and pivotal movement of the comprising elements with respect to one another.

An exemplary illustration of the aforementioned described annular rotation between the drive pulley 26 and driven pulley 28 is displayed in the structural diagram of FIG. 3. In comparison with FIG. 1, note that the central pulley 26 has rotated approximately through an angle of 90°. Since the ratio of the radius R2 to R1, in the present example, is approximately 2 to 1, the annular rotation of the partial pulley 28 will only be approximately 45° from its position in FIG. 1 in order for the arc length of tape unwrapped to be equal to the arc length of tape wrapped (i.e., zero backlash).

In summary, the present invention provides for a compact mechanism having a mechanical advantage in a zero backlash tape drive assembly. The assembly comprises (see FIGS. 1 and 2) a concentric set of pulleys 26 and 28 interconnected to one another via a zero backlash tape 50. The central pulley 26 may have a full periphery while the other pulley 28 may be partially constructed. A tape transport medium 50 may be disposed along the periphery 30 of the central pulley 26, reverse wrapped over the roller pulleys 44 and 46 at the extremities 36 and 38 of the partial toroidal shaped pulley 28, and then along the outside periphery 52 of the pulley 28 finally terminating at the point 56 on the frame 14 or base 16. Recirculating roller bearings 58 may be included to roll along a peripheral race and recirculate through an internal race of the partial pulley 28 as the tape 50 moves along the peripheries of the two pulleys as a result of their relative rotation to one another. Accordingly, the mechanical advantage derived in torque and motion transfer is directly related to the radius R1 of the central pulley 26 with respect to the radius R2 of the partial pulley 28, both radii being measured from the axis of the motor axle 12.

It is understood that while the present invention has been described in connection with a specific structural embodiment such as that shown in FIGS. 1 and 2, it is clear that additions, modifications or deletions may be made to various elements without deviating from the broad principles of the present invention. Consequently, the present invention should not be limited to any one embodiment, but rather be construed in the scope and breadth as recited in the following claims.

I claim:

1. A concentric pulley drive assembly comprising:
   a base,
   a motor including an axle protruding therefrom which is rotatably driven by said motor;
   a frame fixedly mounted to said base for supporting said motor and axle thereof away from said base;
   a first substantially circular pulley disposed on said motor axle and being rotatably driven therewith;
   at least one second pulley shaped as a partial annulus disposed about a substantial portion of the periphery of said first pulley concentrically with respect to said motor axle, a portion of the periphery of said second pulley closest concentrically to the motor axle is juxtaposed with said substantial portion of the periphery of said first pulley;

means for transmitting torque from said first pulley to said second pulley to induce annular rotation of said second pulley about the periphery of said first pulley with respect to said motor axle and commensurate with the rotation of said first pulley; and a support structure coupled to said second pulley and pivotally positionable about said motor axle in conjunction with the annular rotation of said second pulley.

2. A concentric pulley drive assembly in accordance with claim 1 wherein the torque transmitting means includes at least one strip of tape which couples the first and second pulleys and is fixed at one point to a position on the periphery of the first pulley and at another point to a position on the frame.

3. A concentric pulley drive assembly in accordance with claim 1 including two roller pulleys, one being attached to each extremity of the partial pulley.

4. A concentric pulley drive assembly in accordance with claim 3 wherein the torque transmitting means includes at least one strip of tape which is disposed about the portion of the periphery of the first pulley in juxtaposition with the second pulley, extended around at least one of the two roller pulleys, and disposed along the periphery of the second pulley opposite that in juxtaposition with the first pulley, said tape being fixedly attached to a point on the periphery of the first pulley and to at least one point on the frame.

5. A concentric pulley drive assembly in accordance with claim 4 including a pair of brackets attached to each extremity of said second pulley to couple the support structure thereto, said pair of brackets being spaced apart sufficiently to support therebetween the roller pulley which is located at each extremity.

6. A concentric pulley drive assembly in accordance with claim 1 wherein the torque transmitting means includes at least one strip of tape disposed along said portion of the periphery of the first pulley and extended around the periphery of the second pulley opposite the periphery which is in juxtaposition with the first pulley, said tape being fixedly attached to at least one point on the periphery of the first pulley and to a point on the frame.

7. A concentric pulley drive assembly in accordance with claim 6 wherein the peripheral surface of the first and second pulleys having the tape strip disposed thereon are comprised of a material to minimize the coefficient of friction with the tape strip.

8. A concentric pulley drive assembly in accordance with claim 6 including at least one set of recirculating roller bearings disposed along a peripheral race of the second pulley.

9. A concentric pulley drive assembly in accordance with claim 1 wherein:

the first pulley is disposed on the motor axle and housed partially within the frame;

the second pulley is in the form of a partial annulus having sidewalls for pivotal mounting on portions of the motor axle located on both sides of the first pulley, said second pulley having an inner periphery in juxtaposition with a portion of the periphery of the first pulley for annular rotation about the motor axle, said second pulley also being housed partially within the frame; and the torque transmitting means includes at least one strip of tape disposed along the portion of the periphery of the first pulley which is in juxtaposition with said inner periphery of the second pulley and extended around the outer periphery of the second pulley which is opposite said inner periphery, said tape being fixedly attached to a point on the periphery of the first pulley and to at lease one point on the frame.

* * * * *